INVENTORS
KEIZO SHIMANO
TAKASHI SEGAWA

Feb. 3, 1970     KEIZO SHIMANO ET AL     3,492,892
BICYCLE HUB HAVING A BUILT-IN THREE-STAGE SPEED CHANGE MECHANISM
Filed July 5, 1968     5 Sheets-Sheet 2
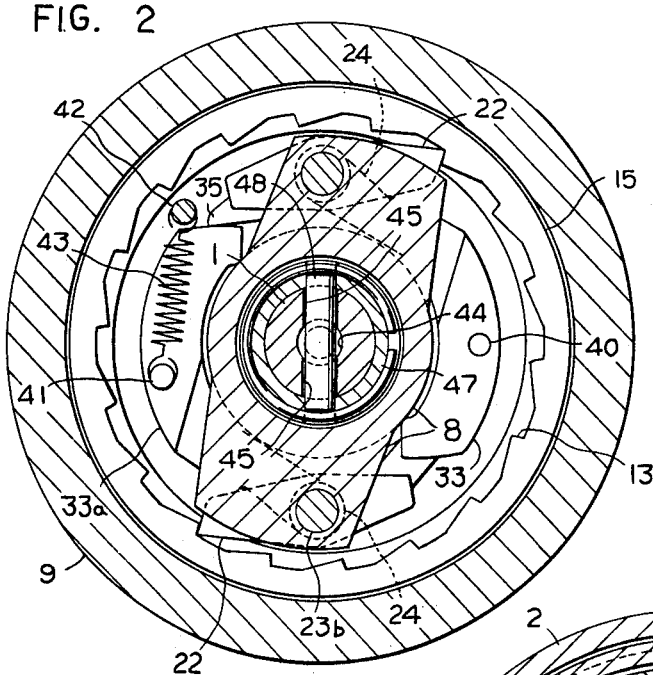
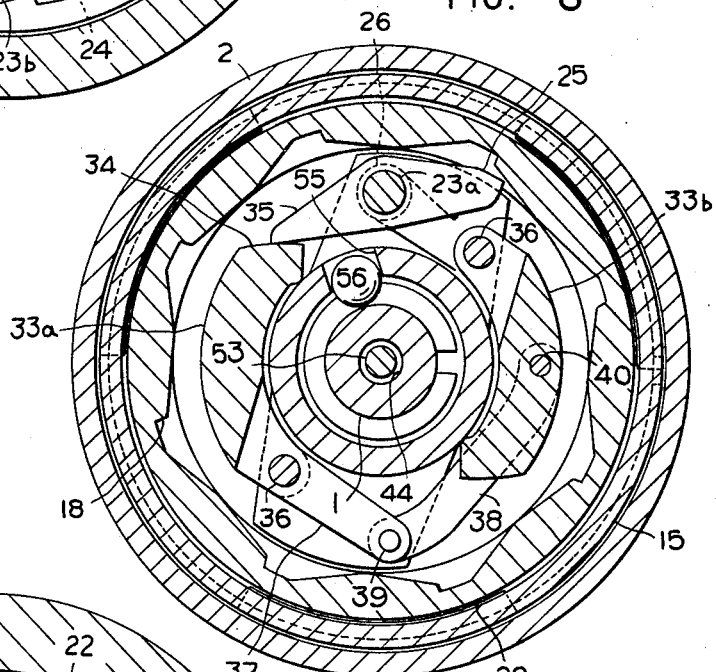
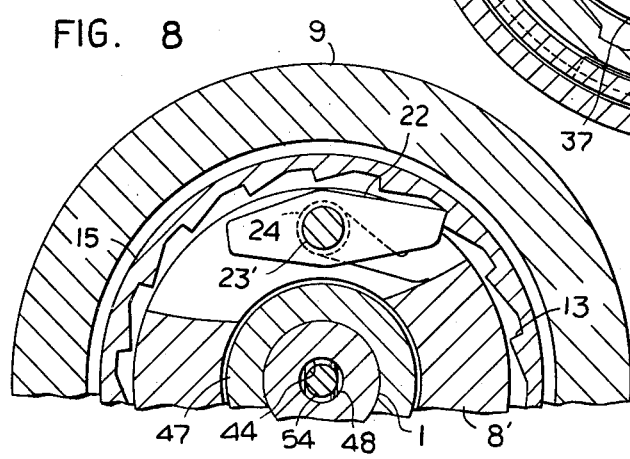
INVENTORS
KEIZO SHIMANO
TAKASHI SEGAWA

INVENTORS
KEIZO SHIMANO
TAKASHI SEGAWA

Feb. 3, 1970 KEIZO SHIMANO ET AL 3,492,892
BICYCLE HUB HAVING A BUILT-IN THREE-STAGE SPEED CHANGE MECHANISM
Filed July 5, 1968 5 Sheets-Sheet 4

INVENTORS
KEIZO SHIMANO
TAKASHI SEGAWA
BY

Feb. 3, 1970  KEIZO SHIMANO ET AL  3,492,892
BICYCLE HUB HAVING A BUILT-IN THREE-STAGE SPEED CHANGE MECHANISM
Filed July 5, 1968  5 Sheets-Sheet 5

INVENTORS
KEIZO SHIMANO
TAKASHI SEGAWA
BY

United States Patent Office 3,492,892
Patented Feb. 3, 1970

3,492,892
BICYCLE HUB HAVING A BUILT-IN THREE-STAGE SPEED CHANGE MECHANISM
Keizo Shimano and Takashi Segawa, Sakai, Japan, assignors to Shimano Kogyo Kabushiki Kaisha, Sakai, Osaka, Japan
Filed July 5, 1968, Ser. No. 742,659
Claims priority, application Japan, Aug. 4, 1967, 42/50,187
Int. Cl. B62d 1/04; G05g 1/10
U.S. Cl. 74—752                                    1 Claim

ABSTRACT OF THE DISCLOSURE

A bicycle hub having a built-in three-stage speed change mechanism, adapted to be driven under low speed ratio power transmission condition, normal speed ratio power transmission condition and high speed ratio power transmission conditions, comprising a planetary gear mechanism, ratchet wheel mechanisms for low-speed driving and high-speed driving provided between the hub shell and the driving drum having a driving sprocket wheel, and provided with an automatic control means consisting of centrifugal governor weights, and also provided with a manually actuated control means for effecting change-over of the driving speed ratio transmission mechanisms.

---

It has been heretofore proposed to provide a bicycle hub having a built-in multistage speed change mechanism adapted to be manually controlled to obtain desired speed change. It has been also proposed such built-in speed change mechanism wherein centrifugal governor weights responsive to the driving speed of the bicycle are provided for automatically controlling the change-over of the speed ratio. In the former multistage speed change mechanism requiring manual control, as the change-over of speed ratio is effected by the driver at will, so that the driver's personal preference in driving would not be realized.

The principal object of the present invention is to provide a bicycle hub having an improved three-stage speed change mechanism, wherein a manual control means is provided for three-stage speed change, i.e. the increased speed ratio transmission condition, the normal speed ratio transmission condition, and the decreased speed ratio transmission condition, can be attained under manual control and, moreover, there is provided means responsive to the driving speed of the bicycle and adapted for automatically effecting two-stage speed change under the normal speed ratio transmission condition as well as under the increased speed ratio transmission condition, whereby the aforementioned disadvantage of the conventional speed change mechanism of this type is removed. Other and further objects of this invention will appear from the following description and the accompanying drawings.

In the drawings:

FIGURES 2 to 5 are cross sections taken along lines II—II, III—III, IV—IV and V—V, respectively, of FIGURE 1;

FIGURES 8 to 11 are cross sections along lines VIII—VIII, IX—IX, X—X and XI—XI, respectively, of FIGURE 7.

Figure 1:
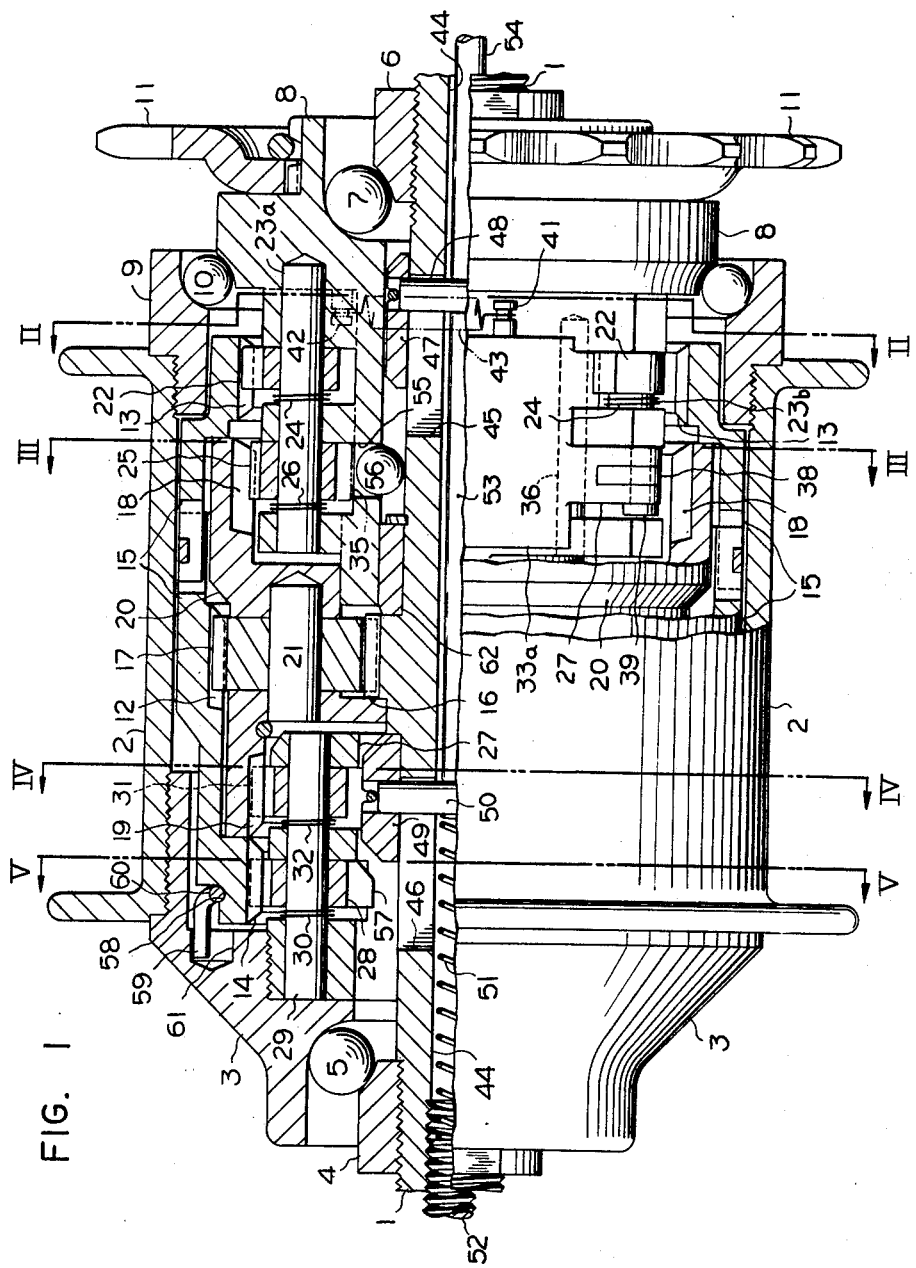
FIGURE 1 is a rear side view partly in longitudinal section of a hub equipped with a built-in automatic speed change mechanism according to the present invention, showing various parts when driven at low speed in increased speed-ratio transmission condition.
Figure 4:
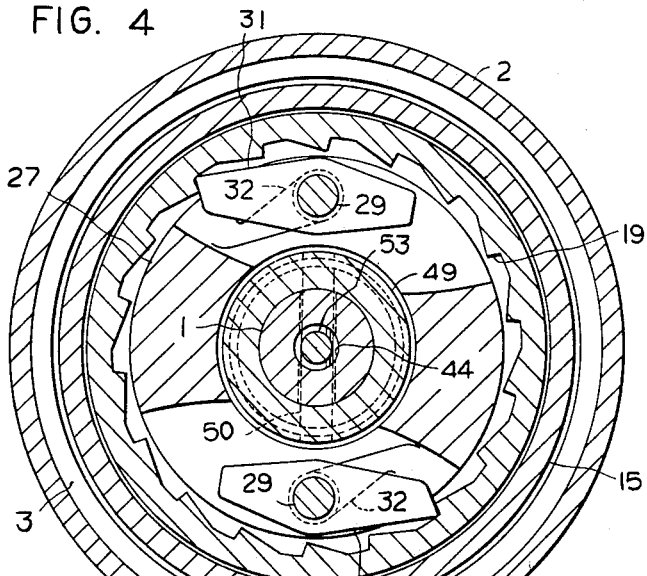
Figure 5:
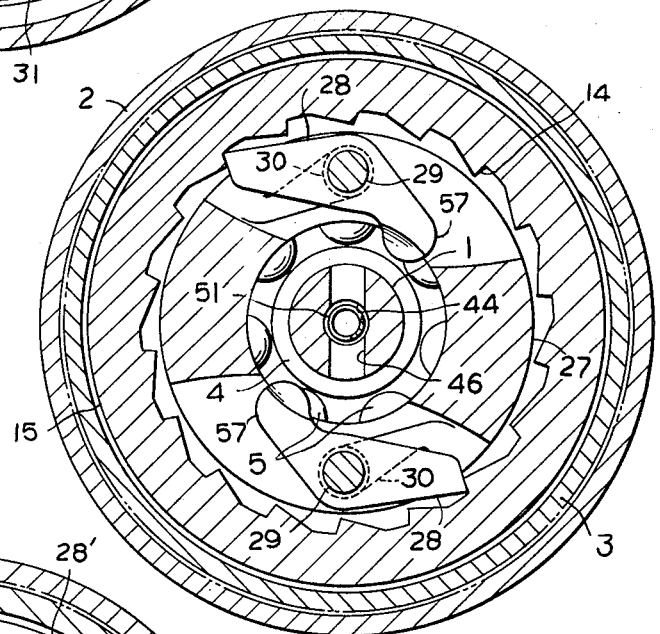
Figure 9:
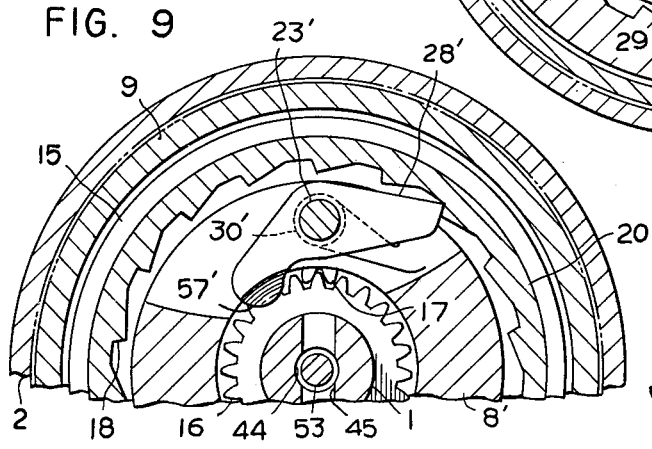
Figure 6:
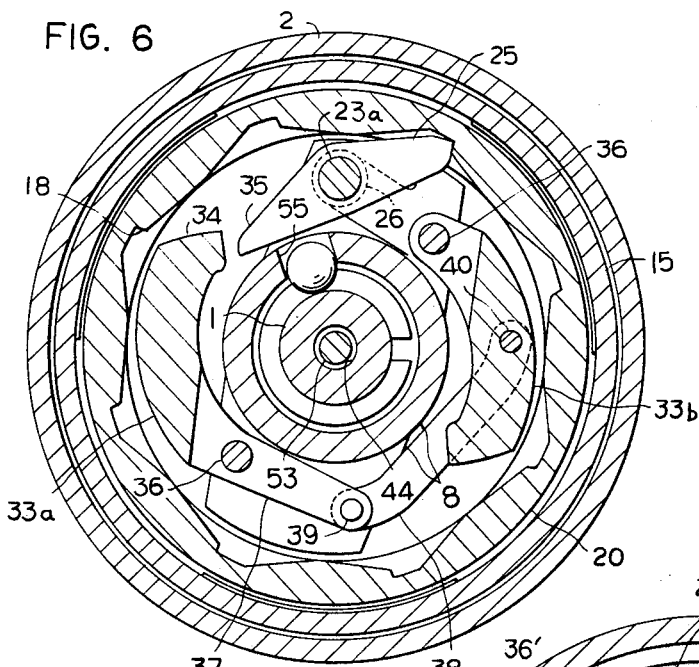
FIGURE 6 is a cross section similar to FIGURE 3, but showing various parts when driven at high-speed under the increased speed-ratio transmission condition.

Referring now to FIGS. 1 to 6, the reference numeral 1 designates a rear dead axle of a bicycle, and 2 is a hub shell mounted through a mounting boss 3 which is supported at the lefthand end by means of a ball bearing consisting of an inner race cone 4 and balls 5. At the righthand end, a driving drum 8 having a driving sprocket wheel 11 is supported by means of a ball bearing consisting of balls 7 and an inner race cone 6 thread fitted to the axle 1. The righthand end of the hub shell 2 is fitted with a mount drum 9 which is supported by a ball bearing consisting of balls 10 and an inner race cone formed on said drive drum, which has an outer race for the balls 7 as shown.

Within the hub shell 2, there is an internal gear carrier frame 15 having an internal gear 12 disposed in the vicinity of the mid point thereof, and provided with an internal ratchet wheel 13 and an internal ratchet wheel 14 disposed respectively at the righthand portion and the lefthand portion thereof. Between a sun gear 16 on the axle 1 and the internal gear 12, there is a plurality of planetary pinions 17, each rotatable around an axis 21, supported by a planet carrier frame 20, which is provided with a righthand internal ratchet wheel 18 and a lefthand internal ratchet wheel 19. The driving drum 8 is provided with a plurality of low speed driving pawls 22 oscillatably mounted on pivots 23a and 23b, each of which is biased by a spring 24 having a tendency of bringing the tips of the pawls 22 engagement with the internal ratchet wheel 13 (FIG. 2). On the inner end portion of said pivot pin 23a, there are oscillatably mounted high speed driving pawls 25, each biassed by a spring 26 having a tendency of bringing the tips of the pawls 25 into engagement with the internal ratchet wheel 18 carried by said planet carrier frame 20. 27 is a driven member extending rightwardly from the mounting boss 3, and carries a plurality of high speed driving pawls 28 (FIG. 5) oscillatably mounted on pivot pins 29 and biassed by springs 30 having a tendency of bringing the tips of the driving pawls into engagement with the internal ratchet wheel 14 on the gear carrier frame 15. At the position in the vicinity of the internal ratchet wheel 19 on the planet carrier frame 20, a plurality of low-speed driving pawls 31 are oscillatably mounted on said pivot pins 29 (FIG. 4), biassed by springs 32 having a tendency of bringing the tips of the pawls into engagement with said internal ratchet wheel 19.

With respect to the driving drum 8, as shown in FIGS. 1 to 3, the main centrifugal governor weight 33a and the auxiliary centrifugal governor weight 33b are oscillatably mounted on separate pivot pins 36, 36, the arcuate abutting face 34 of the main governor weight 33a being abutting against the tail 35 of the said high-speed driving pawl 25 and arranged symmetrically with respect to the axis of the hub. The tail 37 of the main weight 33a is connected to the auxiliary weight 33b by means of a link 38 and pivot pins 39, 40, and so arranged that both governor weights may oscillate inwardly and outwardly around the axis of the hub in synchronism, so that any erroneous oscillation due to any independent oscillation during running of the bicycle may be avoided. The main centrifugal govenror weight 33a has a hook 41 (FIGS. 1 and 2), which is connected to a hook 42 fixed to the driving drum 8 by means of a tension spring 43 having a tendency of holding the tips of the main and auxiliary governor weights 33a and 33b oscillated inwardly against the action of centrifugal force, so that when the driving drum 8 is rotating at speed lower than a predetermined speed the abutting face 34 of the main governor weight 33a prevents the high-speed driving pawl 25 from operative engagement with the internal ratchet wheel 18, while upon increase of the speed of rotation of said driving drum 8, the centrifugal governor weights 33a and 33b will be oscillated outwardly against the action of said spring 43 to release suppression of the rear ends 35 of the driving pawls 25 and to bring the tips of said driving pawls into operative engagement with the internal ratchet wheel 18.

The dead axle 1 has a concentric bore 44 throughout the whole length thereof, and there are formed guide slots 45, 45 and 46, 46, respectively, at the righthand and lefthand portions. In the vicinity of the guide slots 45, the axle 1 is surrounded by a control sleeve 47 having beveled edges. A control pin 48 is diametrically inserted through the guide slots 45 and the control sleeve 47 (FIGS. 1 and 2). Similarly, in the vicinity of the guide slots 46 at the lefthand portion, the axle 1 is surrounded by a control sleeve 49 having beveled guide edges, and a control pin 50 is diametrically inserted through the guide slots 46 and the control sleeve 49. In the lefthand portion of the axial bore 44, there is inserted a spring 51, and the bore end is closed by a plug 52. Said spring 51 has a tendency of pushing the control pins 50 and 48 rightwardly. 53 is an intermediate rod between the control pins 50 and 48, and 54 is a push rod inserted into the axial bore 44 at the righthand end thereof. Said push rod 54 is adapted to be actuated through manipulation of a suitable control means. It will be seen that by actuating said push rod 54 the control sleeves 47 and 49 may be axially moved leftwardly, against the action of the spring 51, or rightwardly by the action of said spring. In the inner extension of the driving drum 8, there is a radial hole 55 facing to the foot portion of the high-speed driving pawl 25 (FIGS. 1 and 3), and a ball 56 is inserted therein. When the control sleeve 47 is moved leftwardly for its full stroke, said ball 56 will be pushed out radially, thereby raising the foot portion of the high speed driving pawl 25, so that the tip of the pawl 25 will be released from engagement with the internal ratchet wheel 18. With respect to each of the high-speed driving pawls 28 on the driven member 27 (FIGS. 1 and 5), there is a driven part 57 at the foot portion thereof, which is adapted to be actuated by said control sleeve 49 when the latter is moved leftwardly for its full stroke, whereby the tip of the pawl 28 is released from engagement with the internal ratchet wheel 14.

Assuming that the various parts are in the increased speed ratio transmission positions as shown in FIGS. 1 to 5, in which the push rod 54 is not pushed in, the control sleeves 47 and 49 are held in their positions pressed rightwardly by means of the spring 51, holding the high-speed driving pawls 25 in the condition to engage with the internal ratchet wheel 18 under the control of the centrifugal governor weights 33a and 33b. In such condition, when the speed of driving rotation of the driving sprocket wheel 11 is low, power therefrom is transmitted through the driving drum 8, the low speed driving pawls 22, the internal ratchet wheel 13, the internal gear carrier 15, the internal ratchet wheel 14, the high speed driving pawls 28, the driven member 27 and the mounting boss 3, whereby the hub shell 2 will be driven under comparatively low-speed of rotation. When the speed of rotation of the driving sprocket wheel 11 is increased, whereby the main and auxiliary centrifugal governor weights 33a and 33b are outwardly oscillated against the action of a spring 43, and the high-speed driving pawls 25 operatively engage with the internal ratchet wheel 18, the rotation of said driving sprocket wheel 11 will be transmitted to the hub shell 2 through the driving drum 8, the high speed driving pawls 25, the internal ratchet wheel 18, the planet carrier frame 20, the planetary pinions 17, the internal gear 12, the internal gear carrier frame 15, the internal ratchet wheel 14, the high-speed driving pawls 28, the driven member 27, and the mount boss 3, whereby the hub shell 2 will be driven under comparatively high-speed. Under the above mentioned high-speed driving as well as low-speed driving, the low-speed driving pawls 31 are in engagement with the internal ratchet wheel 19, whereas said internal ratchet wheel 19 will not be substantially effective, since the same internal ratchet wheel always rotates at lower speed than that of the adjacent internal ratchet wheel 14. With respect to the low-speed driving pawls 22, it will be seen that said pawls 22 remain in engagement with the internal ratchet wheels 13 during high-speed driving, and that said internal ratchet wheel 13 always rotates at higher speed than the adjacent internal ratchet wheel 18, so that said ratchet wheel 13 does not substantially effectively operate.

When the push rod 54 is pushed in for a predetermined extent, the control sleeve 47 being moved leftwardly to a position short of contact with the ball 56, the high-speed driving pawls 28 on the driven member 27 will be disengaged from the internal ratchet wheel 14, with its driven part 57 actuated by the control sleeve 49, whereby obtaining the normal speed ratio transmission condition of the various parts. When the driving sprocket wheel 11 is driven at low speed under such normal speed ratio transmission condition, its power is transmitted to the hub shell 2 through the driving drum 8, the low-speed driving pawls 22, the internal ratchet wheel 13, the internal ratchet wheel 15, the internal gear 12, the planetary pinions 17, the planet carrier frame 20, the internal ratchet wheel 19, the low-speed driving pawls 31, the driven member 27 and the mounting boss 3, whereby the hub shell 2 will be driven at comparatively low speed. On the contrary, when the driving sprocket wheel 11 is driven at high speed, and the high-speed driving pawls 25 are brought into engagement with the internal ratchet wheel 18 due to the operation of the centrifugal governor weights 33a and 33b, whereby the rotation of said driving sprocket wheel 11 will be transmitted to the hub shell 2, through the driving drum 8, the high-speed driving pawls 25, the internal ratchet wheel 18, the planet carrier frame 20, the internal ratchet wheel 19, the low-speed driving pawls 31, the driven member 27 and the mounting boss 3, whereby the hub shell 2 will be driven at comparatively high speed through said direct transmission of power. In such case, while the low-speed driving pawls 22 are in engagement with the internal ratchet wheel 13, the latter is not substantially effective, since said internal ratchet wheel 13 is rotating at higher speed than the adjacent internal ratchet wheel 18.

When the push rod 54 is pushed in for its full stroke to shift the ball 56 outwardly, the high speed driving pawls 25 are disengaged from the internal ratchet wheel 18 irrespectively of the control of the centrifugal governor weights 33a and 33b, and on the other hand the high-speed driving pawls 28 on the driven member 27 are also disengaged from the internal ratchet wheel 14 by the action of the control sleeve 49. Under such decreased speed driving condition, the transmission of direct connection, while high-speed driving is effected at reduced speed through the similar route of the above mentioned low-speed driving under the normal speed ratio driving condition, irrespective of the driving speed of the sprocket wheel 11.

In other words, under increased speed ratio transmission condition the low-speed driving is effected through direct connection, while high speed driving is effected under increased speed ratio transmission condition, and under normal speed ratio transmission condition the low-speed driving is effected under reduced speed ratio transmission condition, and high-speed driving is effected through direct connection. Under reduced speed ratio transmission condition, the driving is always effected at reduced speed.

In the aforementioned embodiment of this invention, assuming that the high-speed ratio transmission condition, with the pawls 25 in engagement with the internal ratchet wheel 18, is changed over to the low-speed ratio transmission condition upon the outward oscillation of the main and auxiliary centrifugal governor weights 33a and 33b, or that the bicycle was stopped after low-speed driving, the high-speed driving pawls 25 remain in engagement with the internal ratchet wheel 18, so that upon the back pedalling or pedalling stop will result in reverse rotation of the driving drum 8 relative to the internal ratchet wheel 8, bringing the foot portion 35 of the driving pawls 25 to abut against the face 34 of the main governor weight 33a. This would be ready for the next automatic speed change. However, if the driving drum 8 were rotated in the reverse direction relative to the hub shell 2, it may happen that the disengagement of the high-speed driving pawls 25 are not effected, since the internal ratchet wheel 18, i.e. the planet carrier frame 20 and the internal gear carrier frame 15 can not be reliably held in association with the hub shell 2. In order to remove such disadvantage, at the lefthand portion of the internal gear carrier frame 15 there is provided an annular recess 58, into which an annular spring 60 having an axial projection 59 is inserted, and said projection 59 is inserted into a hole 61 provided in the mounting boss 3. The internal gear carrier frame 15 and the planet carrier frame 20 are preferably arranged in moderate frictional contact with the associated parts. In FIG. 1, 62 is an oilless bearing on the dead axle 1 in the vicinity of the sun gear 16, which bearing supports the inner extension of the driving drum 8.

It will be seen, in the aforementioned embodiment of this invention, that the operative engagement of the driving pawls with the high-speed driving ratchet wheel is changed over by the action of the centrifugal governor weights, and that such automatic speed change-over may be effected at any driving condition always according to the rotation of the driving drum 8, that is, according to the predetermined pedalling speed.

The modified form of embodiment of this invention as shown in FIGS. 7 to 10 differs from the aforementioned embodiment shown in FIGS. 1 to 6 in this that the high speed driving ratchet wheel at the driven member side is controlled by the action of the centrifugal governor weights, the remaining points being similar to the embodiment of FIGS. 1 to 6. Due to the partial identity of the structure illustrated in the embodiment in FIGS. 7 to 10 and of that illustrated in FIGS. 1 to 6, the present embodiment will be described by corresponding reference numerals.

Figure 11:
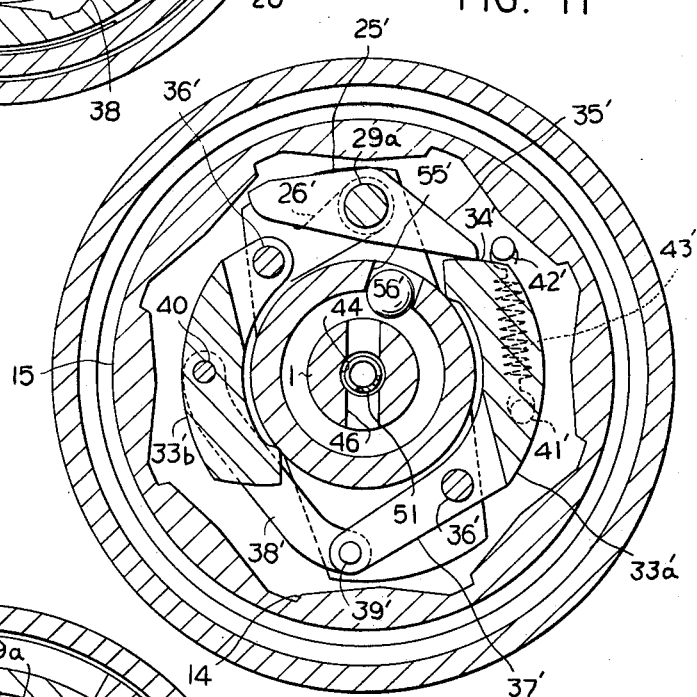
Figure 10:
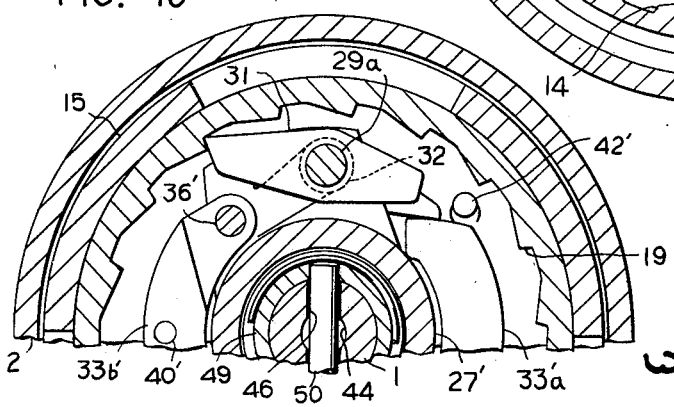
Figure 7:
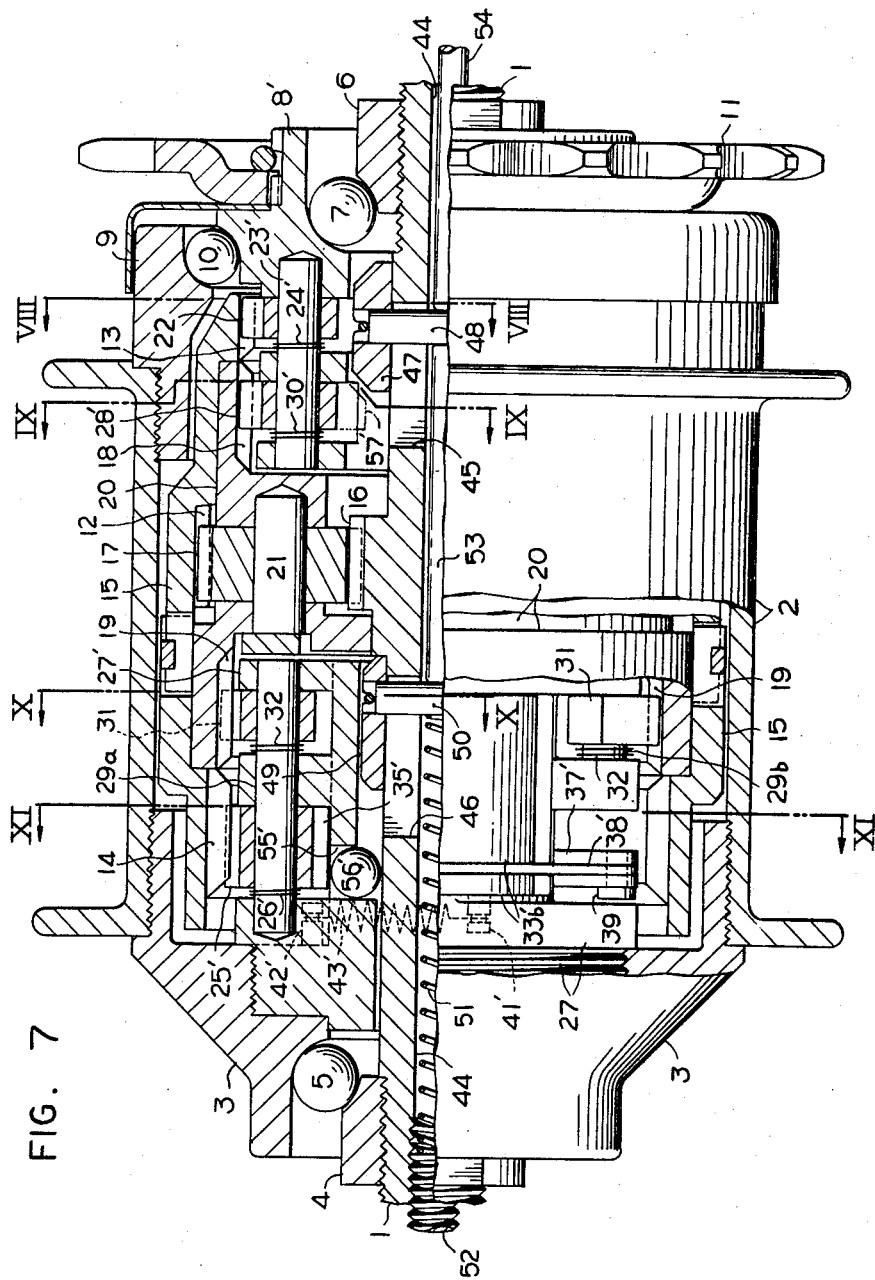
FIGURE 7 is a rear side view partly in longitudinal section corresponding to FIGURE 1, showing a modified form of the mechanism of this invention, and showing various parts when driven at low speed in increased speed-ratio transmission condition.

At the lefthand portion of the driving drum 8', there are high-speed driving pawls 28', each biased by a spring 30' to be brought into engagement with the internal ratchet wheel 18. Each high speed driving pawl 28' has a guide tail 57' facing to the lefthand edge of the control sleeve 47, the parts being so arranged that the tip of the driving pawl 28' is disengaged from the internal ratchet wheel 18 when the control sleeve 47 is shifted inwardly (leftwardly) for a predetermined extent. On the driven member 27' there are oscillatably mounted on pivots 29a and 29b a plurality of low sped driving pawls 31. There are also oscillatably mounted on the same pivot 29a a high speed driving pawl 25' biased by a spring 26' to be brought into engagement with the internal ratchet wheel 14. As shown in FIGS. 7, 10 and 11, the main and auxiliary centrifugal governor weights 33a' and 33b' are oscillatably mounted on pivots 36' and 36', respectively, with arcuate tip faces 34' facing to the tail 35' of said high-speed driving pawl 25'. The tail 37' of the main governor weight 33a' is connected to the auxiliary governor weight 33b' by means of a link 38' and pin 40'. The main governor weight 33a' has a hook 41', which is connected by a tension spring 43' to a hook 42' fitted on the driven member 27', whereby the main and auxiliary governor weights 33a' and 33b' are normally held in inwardly oscillated position. When the speed of rotation of the driven member 27' reaches higher than the pretedmined speed, both governor weights 33a' and 33b' will be outwardly oscillated against the action of the spring 43', whereby automatically releasing the suppression of the tail 35' of the high speed driving pawl 25', allowing the tip of said driving pawl to be brought out of engagement with the internal ratchet wheel 14.

In the increased speed transmission condition, with the push rod 54 held untouched, when the speed ratio of the rotation of the hub shell is low as shown in the drawing, the rotation of the driving drum 8' is transmitted through the high speed driving pawls 28', the internal ratchet wheel 18, the planet carrier frame 20, the internal ratchet wheel 19, the low-speed driving pawls 31, the driven member 27' and the mounting boss 3, to the hub shell 2, thereby rotating the latter at comparatively low speed. On the contrary, when the speed of rotation of the hub shell 2 is relatively low, the high speed driving pawls 25' are in operative engagement with the internal ratchet wheel 14, and rotation of the driving drum 8' is transmitted through the high speed driving pawls 28', the internal ratchet wheel 18, the planet carrier frame 20, the planetary pinions 17, the internal gear 12, the internal gear carrier 15, the internal ratchet wheel 14, the high-speed driving pawls 25', the driven member 27' and the mounting boss 3, to the hub shell 2, thereby driving the latter at comparatively high speed of rotation. When the push rod 54 is pushed in for the full stroke, the high speed driving pawls 28' and 25' are brought out of operative engagement with respective internal ratchet wheels under control of the control sleeves 47 and 49, respectively, whereby making the reduced speed transmission condition. Under such transmission condition, irrespective of high or low speed of desired rotation of the hub shell 2, the hub shell is driven at reduced speed through the same route as aforementioned.

In the embodiment of the invention shown in FIGS. 7 to 11, as in the embodiment of FIGS. 1 to 6, under the normal speed ratio transmission condition, when the running speed of the bicycle is low the transmission of power is effected through the low-speed transmission route, whilst when the running speed of the bicycle is high the transmission of power is effected through the higher speed transmission route. Under reduced speed transmission condition, on the other hand, the embodiment of FIGS. 7 to 11 differs from that shown in FIGS. 1 to 6 in this that the automatic change-over of speed may be effected always at same running speed of the bicycle.

From the foregoing it will be understood, with the bicycle hub equipped with the built-in three stage speed change mechanism according to the present invention, comprising a planetary gear, the driving pawls adapted to be engaged with the internal ratchet wheel and a control means for bringing said driving pawls into or out of engagement with the ratchet wheels, that there is provided a ratchet mechanism between the planet carrier frame and an internal gear having high speed driving pawls and separate ratchet mechanism between the hubs shell and said internal gear and the planet carrier frame having high speed driving pawls, and that the change-over of operative engagement or disengagement of said ratchet mechanisms is automatically controlled by the action of the centrifugal governor weights according to the running speed of rotation. As a result, according to the invention, it is possible to manually effect the three-stage speed change, i.e. increased speed, the normal speed and reduced speed. Moreover, according to the present invention, whilst at start of driving or at lower speed of rotation driving is made under the normal speed ratio condition, when speed is increased automatic change-over of the driving speed can be effected. Thus, immediately after change-over to the normal speed ratio transmission condition it may be manually changed over to the increased speed ratio transmission condition. In case of continued driving on an uphill road or driving against the wind, one may effect manual change-over to the decreased speed ratio transmission condition, whereby driving at decreased speed ratio condition. In case of driving on usual road, the driver may at will select any desired speed ratio transmission condition, utilizing the automatic change-over mechanism.

What we claim is:

1. A bicycle hub having a built-in three-stage speed change mechanism of the planetary gear type consisting of a rigid sun gear, planetary pinions carried by a planet carrier frame, and an internal gear, being arranged between a driving drum and the hub shell, and which comprises high speed transmission ratchet wheel mechanism arranged respectively between said driving drum and said planet carrier frame and said internal gear respectively, and wherein said hub shell and said internal gear and planet carrier frame are respectively associated with the high-speed transmission ratchet wheel and the low speed transmission ratchet wheel mechanism, and means for manually controlling the change-over of the operative engagement and disengagement of said ratchet wheel mechanisms for effecting three stage speed change, and centrifugal governor weights responsive to the speed of rotation of automatically controlling the change-over of operative engagement and disengagement of the high speed transmission ratchet wheel mechanism, the arrangement being such that under the normal speed ratio transmission condition and under the increased speed ratio transmission condition, the low-speed driving is effected through one stage lower speed transmission route, while the high speed driving is effected through one stage higher speed transmission route, as automatically changed over.

References Cited

UNITED STATES PATENTS 3,143,005  8/1964  Schwerdhöfer.
3,286,549  11/1966  Schwerdhöfer.

LEONARD H. GERIN, Primary Examiner